(12) United States Patent
Green et al.

(10) Patent No.: US 8,236,263 B2
(45) Date of Patent: Aug. 7, 2012

(54) METHODS FOR REDUCING AIRBORNE FORMALDEHYDE

(75) Inventors: George D. Green, Cary, IL (US);
Raymond J. Swedo, Mount Prospect, IL (US); Ian A. Tomlinson, Midland, MI (US); Alan R. Whetten, Vernon Hills, IL (US); Charles E. Coburn, Vernon Hills, IL (US); Mark A. Henning, Barrington, IL (US); Paul M. Novy, Buffalo Grove, IL (US)

(73) Assignee: Dow Global Technologies LLC, Midland, MI (US)

( * ) Notice: Subject to any disclaimer, the term of this patent is extended or adjusted under 35 U.S.C. 154(b) by 562 days.

(21) Appl. No.: 12/575,495

(22) Filed: Oct. 8, 2009

(65) Prior Publication Data
US 2010/0124524 A1 May 20, 2010

Related U.S. Application Data

(60) Provisional application No. 61/115,162, filed on Nov. 17, 2008.

(51) Int. Cl.
*B01D 53/02* (2006.01)
(52) U.S. Cl. ........................ 423/245.1; 588/249; 588/405
(58) Field of Classification Search ............... 423/245.1; 588/249, 405
See application file for complete search history.

(56) References Cited

U.S. PATENT DOCUMENTS

| | | | |
|---|---|---|---|
| 4,409,375 A | 10/1983 | Hartman et al. |
| 4,501,628 A | 2/1985 | McGuire et al. |
| 4,517,111 A | 5/1985 | Dorman et al. |
| 4,761,184 A | 8/1988 | Markessini |
| 4,892,719 A | 1/1990 | Gesser |
| 5,021,522 A | 6/1991 | Durairaj et al. |
| 5,160,503 A | 11/1992 | Smith |
| 5,328,635 A | 7/1994 | Chou et al. |
| 5,401,628 A | 3/1995 | Chiodi |
| 5,506,329 A | 4/1996 | Chou et al. |
| 6,395,819 B1 | 5/2002 | Espiard et al. |
| 6,646,034 B2 | 11/2003 | Mori et al. |
| 2006/0222877 A1 | 10/2006 | Khabbaz et al. |
| 2008/0271381 A1 | 11/2008 | Harashina et al. |

FOREIGN PATENT DOCUMENTS

| | | |
|---|---|---|
| WO | 9321116 A1 | 10/1993 |
| WO | 9514528 A1 | 6/1995 |
| WO | 2008073212 A2 | 6/2008 |

OTHER PUBLICATIONS

TRIS AMINO 40% Concentrate, Tromethamine Buffer, ANGUS Sales Sheet.
AMP, 2-Amino-2-Methyl-1-Propanol Solution CAS Registry No. 124-68-5, ANGUS Technical Bulletin.
ANGUS "Metalworking Fluid Additives".
"Wood: Adhesives", Encyclopedia of Materials: Science and Technology, 2001, 1-17, "www.fpl.fs.fed.us/documnts/pdf2001/conne01a.pdf", Elsevier Science Ltd.
International Search Report and Written Opinion for PCT/US2009/059914, dated Dec. 4, 2009.
GAMS et al., "Uber Melamin-Formaldehyd-Kondensationsprodukte", Fasciculus Gaudentio Engi Dicatus, 302E-319E.

*Primary Examiner* — Edward Johnson

(57) ABSTRACT

Provided is a method for scavenging airborne formaldehyde. The method comprises contacting the airborne formaldehyde with a formaldehyde scavenger of the formula I:

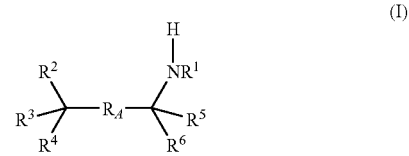

(I)

where $R^1$, $R^2$, $R^3$, $R^4$, $R^5$, $R^6$, and $R_A$ are as defined herein.

16 Claims, No Drawings

METHODS FOR REDUCING AIRBORNE FORMALDEHYDE

CROSS-REFERENCE TO PRIOR APPLICATION

This application claims priority to U.S. provisional application Ser. No. 61/115,162, filed Nov. 17, 2008, which is incorporated herein by reference in its entirety.

FIELD OF THE INVENTION

The invention relates to methods for reducing airborne formaldehyde by exposing the formaldehyde to a formaldehyde scavenger.

BACKGROUND OF THE INVENTION

Many products available for indoor use (e.g. self assembled furniture) release small amounts of formaldehyde and other volatile aldehydes into the air. Because of concerns over the adverse affects of formaldehyde on health, formaldehyde is closely regulated in the work environment to very low levels. In the home environment, however, adventitious formaldehyde released from adhesives, particle board and a variety of other household sources can result in airborne formaldehyde levels that are potentially above generally acceptable limits.

There is a need for new technologies that reduce or eliminate airborne formaldehyde.

BRIEF SUMMARY OF THE INVENTION

In one aspect, the invention provides a method for reducing airborne formaldehyde. The method comprises: providing an article that emits airborne formaldehyde into its environment; and contacting the airborne formaldehyde with a formaldehyde scavenger such that the airborne formaldehyde reacts with the formaldehyde scavenger to form a conjugate compound, wherein the formaldehyde scavenger is of the formula I as described herein.

DETAILED DESCRIPTION OF THE INVENTION

As noted above, the invention provides a method for reducing airborne formaldehyde. The method utilizes compounds of formula I to scavenge the formaldehyde. It has been discovered by the inventors that compounds of formula I as described herein are capable of extracting low levels of formaldehyde from air resulting in reduced airborne formaldehyde concentrations. In some embodiments, the formaldehyde concentration can be reduced to below 1 ppm. In some embodiments, a greater than 95% reduction in airborne formaldehyde is observed, even when the starting concentration of the formaldehyde, prior to exposure to the scavenger, is already low (e.g., below 1 ppm).

It has also been unexpectedly found that the formaldehyde scavengers of the invention remove airborne formaldehyde more efficiently than urea and acetoacetamide, two well-known compounds used in wood composite and textile manufacturing processes for this purpose. A further significant advantage of the invention is the high stability of the reaction products (the conjugate compounds) produced when the formaldehyde is scavenged. As a consequence, there is a reduced likelihood that the formaldehyde, once scavenged, will be re-released.

Unlike most prior art technologies which involve incorporation of a scavenger into, for example, wood composite and textile manufacturing processes (such as by incorporation into the formaldehyde-based resin), the invention is a post-processing scavenging method and is independent of the product releasing the formaldehyde into the atmosphere. As a consequence, the negative effects of incorporating scavengers into manufacturing processes, such as reduced binder effectiveness, are not seen with the invention.

In the invention's principal embodiment (referred to as embodiment 1), the formaldehyde scavenger is a compound of the formula (I):

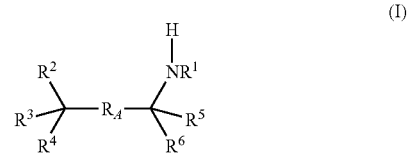

or salt thereof, wherein
$R_4$ is a bond or is $C(R^7R^8)$;
$R^1$ is H, OH or $C_1$-$C_6$ alkyl;
$R^2$ is H, OH or $C_1$-$C_6$ alkyl;
$R^3$, $R^4$, $R^5$, and $R^6$ are independently H, or $C_1$-$C_6$ alkyl;
$R^7$ and $R^8$ are independently H, OH or $C_1$-$C_6$ alkyl;
wherein alkyl in $R^1$-$R^8$ is optionally independently substituted with OH, $NR^9R^{10}$, $C_1$-$C_6$ alkyl, or phenyl, wherein $R^9$ and $R^{10}$ are independently H or $C_1$-$C_6$ alkyl,
and provided that if neither $R^7$ nor $R^8$ is OH, then at least one of $R^1$ and $R^2$ is OH.

Preferably in embodiment 1, $R^1$ is H (embodiment 2).

Preferably in embodiments 1-2, $R_4$ is a bond and $R^2$ is OH (embodiment 3). Further preferably in this embodiment, $R^1$, $R^3$, and $R^4$ are each H, $R^5$ is H or optionally substituted $C_1$-$C_6$ alkyl, and $R^6$ is optionally substituted $C_1$-$C_6$ alkyl, preferably $C_1$-$C_3$ alkyl, more preferably methyl.

Preferably in embodiments, 1-3 $R^1$, $R^3$, and $R^4$ are each H and $R^5$ and $R^6$ are independently optionally substituted $C_1$-$C_6$ alkyl, more preferably one of $R^5$ and $R^6$ is unsubstituted and the other is substituted with OH.

Preferably in embodiments 1-3, $R^1$, $R^3$, and $R^4$ are each H and $R^5$ and $R^6$ are independently optionally substituted $C_1$-$C_6$ alkyl, more preferably both of $R^5$ and $R^6$ are substituted with OH.

Preferably in embodiment 1, $R^1$ is OH (embodiment 4). More preferably within this embodiment, $R_4$ is a bond and $R^2$, $R^3$, $R^4$, and $R^5$ are each H, and $R^6$ is optionally substituted $C_1$-$C_6$ alkyl, preferably unsubstituted $C_1$-$C_3$ alkyl, more preferably methyl.

Particularly preferred scavengers according to embodiments 1-4 are 2-amino-1-butanol, 2-amino-2-ethyl-1,3-propanediol, 2-amino-2-methyl-1-propanol, 2-amino-1-methyl-1,3-propanediol, tris (hydroxymethyl) aminomethane, N-isopropylhydroxylamine, ethanolamine, diethanolamine, N-methylethanolamine, N-butylethanolamine, monoisopropanolamine, diisopropanolamine, mono-sec-butanolamine, di-sec-butanolamine, and salts thereof. An especially preferred formaldehyde scavenger is tris (hydroxymethyl) aminomethane. These scavengers are available from a variety of commercial sources, including ANGUS Chemical Company (Buffalo Grove, Ill., USA), The Dow Chemical Company (Midland, Mich., USA), or can be readily prepared by techniques well known in the art. The formula I compounds can be used in the form of salts. Suitable salts include hydrochloride, acetate, formate, oxalate, citrate, carbonate, sulfate, and phosphate.

The formaldehyde scavenger of formula I operate to scavenge airborne formaldehyde by reacting with the formaldehyde to form a reaction product referred to herein as a "conjugate compound." The reaction forming the conjugate compound is essentially irreversible under ambient conditions of temperature and pressure and is therefore a very effective method of sequestering the formaldehyde such that it is not re-released.

If the amine and alcohol groups of the formaldehyde scavenger reside on separate atoms, then the conjugate compound is typically a cyclic structure. In some preferred embodiments, the conjugate compound is an oxazolidine compound, and more preferably it is a compound of the formula (II):

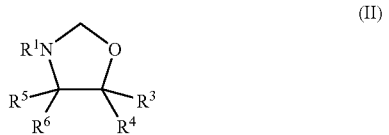

(II)

or salt thereof, wherein $R^1$, $R^3$, $R^4$, $R^5$, and $R^6$ are as defined above for formula (I), including preferred embodiments thereof.

In a further preferred embodiment, the conjugate compound is an oxazine, and more preferably an oxazine of the formula (III):

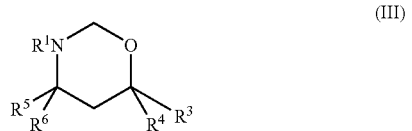

(III)

or salt thereof, wherein $R^1$, $R^3$, $R^4$, $R^5$, and $R^6$ are as defined above for formula (I), including preferred embodiments thereof.

If the alcohol in the formaldehyde scavenger is on the amine (e.g., $R^1$ in formula I is OH), then the conjugate compound is typically a nitrone. In a preferred embodiment, the nitrone is a compound of the formula (IV):

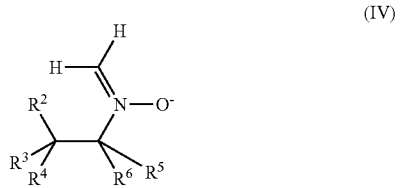

(IV)

or salt thereof, wherein $R^2$, $R^3$, $R^4$, $R^5$, and $R^6$ are as defined above for formula (I), including preferred embodiments thereof.

Some preferred conjugate compounds according to the foregoing preferred embodiments include the following:

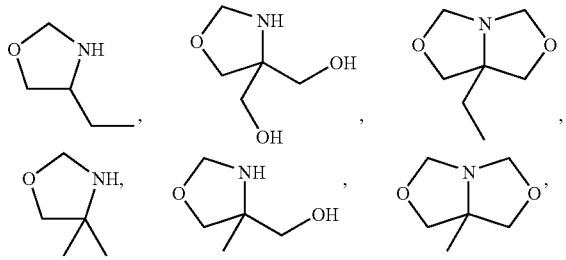

-continued

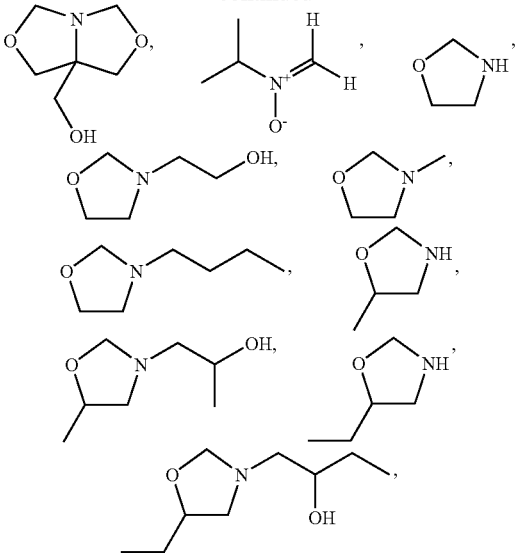

or salts thereof.

The formaldehyde scavengers of formula I are used in the invention to scavenge airborne formaldehyde from the environment or airspace surrounding articles that emit such formaldehyde. The scavengers can be used in various forms depending, for example, on the particular application and, in some instances, on the physical state of the scavenger or the resulting conjugate compound (i.e., whether liquid or solid). For instance, when the formaldehyde scavenger is a solid, it may be dispersed loosely, as in trays, or contained in a permeable container or cartridge that is placed in the formaldehyde contaminated environment. When the formaldehyde scavenger is a solid and the conjugate compound is also a solid, the formaldehyde scavenger may also, for example, be used as a powder formulation contained in a paper sachet similar to the type used for silica gel packages typically included in product packaging for moisture reduction. In this embodiment, sachets containing the formaldehyde scavenger may, for instance, be included in packaging to reduce buildup of formaldehyde levels in the packaging.

The formaldehyde scavenger may also be coated onto a solid particle such as silica, activated carbon, wood powder etc. If the conjugate product is a liquid, coating can achieve the same effect of a solid to solid product upon sequestering the formaldehyde.

By way of further example, the scavengers are suitable for use in warehouses, composite wood and textile production facilities in which formaldehyde resins are used, mobile homes, attics, areas of continual air flow such as air handling systems, air ducts, or near a heating/cooling system's intake or exhaust where the air flow would be concentrated. The scavengers can also be applied to substrates via extrusion into laminate layers, such as wallboard. The scavengers can also be added to carpet backsizings, deposited on wallpaper, included in non-formaldehyde glue e.g. wall paper paste, used in cabin filters to remove formaldehyde from incoming air, or in glass fiber insulation, via incorporation into/onto the facing paper, or coating on the fibers. The scavengers can also be used on textiles and fabrics such as permanent pressed products e.g. draperies, dress shirts etc. The formaldehyde scavengers can also be included in a consumer static air freshener module used in the home.

When the formaldehyde source is a formaldehyde-based resins or adhesive, it is less preferable that the formaldehyde scavenger be incorporated into the resin or adhesive since the resin/adhesive competes for the formaldehyde thus diminishing the desired properties of the material.

Coating a solution of formaldehyde scavenger directly onto the surface of an article, such as wood composite products, the packaging containers used with such articles, a building framework, or otherwise depositing onto other fabrics (e.g. draperies, carpets, air strips) is an alternative approach since upon drying, the crystals (or absorbed formaldehyde scavenger when not a solid) are readily available for reaction with airborne formaldehyde. Various coating methods can be employed depending on the substrate to be coated and include spraying, dipping, sizing, curtain coating, blade coating, and brush applications.

Because of the efficacy of the formaldehyde scavengers, it is not necessary that active air circulation be employed around the compounds. Indeed, it is preferred that the formaldehyde scavengers be used to passively remove formaldehyde from the surrounding environment (i.e., no mechanical air circulation is used). To facilitate this preferred embodiment, it is also preferred that the scavenger be provided in a sachet as described above, which yields a mechanism for extended exposure of the scavenger to the formaldehyde (e.g., where the sachet is placed inside the packaging of, for instance, self assembled furniture).

In a preferred embodiment of the invention, the formaldehyde scavenger and the conjugate compound are both solids at ambient temperature (about 22-27° C.) and pressure (about 1 atm). This embodiment is referred to as a solid-solid combination. Such solid-solid combinations are highly preferable because they do not require a containment device or a support material to hold the conjugate compound, which may be needed if the conjugate compound is a liquid at ambient temperature and pressure. As a consequence, the solid-solid combination is amenable to a broad range of product designs. A particularly preferred formaldehyde scavenger for the solid-solid embodiment is tris (hydroxymethyl) aminomethane. This compound forms solid mono and/or bis oxazolidines upon reaction with formaldehyde.

"Alkyl," as used in this specification, encompasses straight or branched chain alkyl groups having the indicated number of carbon atoms. Where the number of carbon atoms is not specifically indicated, alkyl contains 1-20 carbon atoms, more preferably 1-10 and even more preferably 1-6. Non-limiting examples of alkyl include methyl, ethyl, n-propyl, iso-propyl, butyl, hexyl, methylhexyl, heptanyl, methyl heptanyl, and the like. The alkyl may be unsubstituted or it may be substituted with the indicated group(s).

The following examples are illustrative of the invention but are not intended to limit its scope.

EXAMPLES

Examples 1-11

Evaluation of Several Formaldehyde Scavengers

The following scavengers are evaluated in these examples:

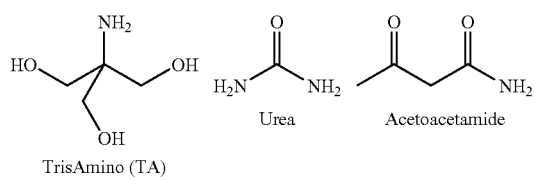

TrisAmino (TA)    Urea    Acetoacetamide

-continued

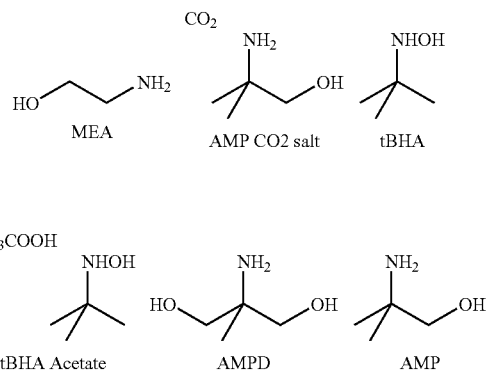

MEA    AMP CO2 salt    tBHA tBHA Acetate    AMPD    AMP

A series of experiments are performed in order to show the relative effectiveness of various formaldehyde scavengers. Samples (approximately 0.10 g) of the scavengers are weighed onto small glass watch glasses. The watch glasses containing the scavengers are placed individually into clean, dry 1-liter glass bottles. Aliquots (10 microliters) of 18.5% aqueous formaldehyde in glass vials are placed into the jars which are subsequently sealed with caps having a port for sampling with Drager tubes. The jars are allowed to equilibrate under ambient laboratory conditions for 4 days. The jars are then sampled for free formaldehyde in the vapor phase by inserting a Drager tube through the port and withdrawing the headspace gas. During sampling, the headspace is continuously replenished by ambient air causing a dilution effect. A correction factor is applied to account for dilution during the sampling process. The correction factors are calculated using the anticipated average concentration as follows:

| # 100 mL Samples Withdrawn | Original Concentration | Final Concentration | Average Concentration | Correction Factor |
|---|---|---|---|---|
| 0 | 100 | 100 | 100 | 1 |
| 1 | 100 | 90 | 95 | 1.05 |
| 2 | 90 | 81 | 90.3 | 1.11 |
| 3 | 81 | 72.9 | 86.0 | 1.16 |
| 4 | 72.9 | 65.6 | 81.9 | 1.22 |
| 5 | 65.6 | 59.1 | 78.1 | 1.28 |

In several cases, the initial Drager tube chosen is outside the range of the formaldehyde being measured. Where possible in those cases, a second Drager tube was is to try to obtain results within the appropriate calibration range. For multi tube readings, the initial concentration at the start of the second tube reading is taken to be 59.1% of the original concentration corresponding to a correction factor of (100/59.1)=1.69. Additional correction for the number of aliquots taken in the second tube is then applied on top of this original dilution factor. For example, 1.69*1.05=1.77 for a single 100 mL aliquot or 1.69*1.28=2.16 for 5-100 mL aliquots in the second tube.

| Bottle # | Scavenger, (g) | Drager Tube Used | #, volume of Drager aliquots | H2CO Reading (ppm) | Final H2CO (corrected, ppm) |
|---|---|---|---|---|---|
| 1 | None, 0.0 (comparative example) | 91M | 1 × 100 mL | 900.00 | 945.00 |
| 2 | TA, 0.1058 (invention example) | 91LL | 5 × 100 mL | <0.05 | <0.06 |
| 3 | Urea, 0.1035 (comparative example) | 91LL | 5 × 100 mL | >1.0 | >1.28 |
| 4 | Acetoacetamide, 0.0996 (comparative example) | 91LL | 5 × 100 mL | 0.15 | 0.19 |
| 5 | MEA, 0.1015 (invention example) | 91L | 5 × 100 mL | <0.1 | <0.13 |
| 6 | tBHA, 0.1011 (invention example) | 91L 91M | 5 × 100 mL 1 × 100 mL | 50.00 | 88.50 |
| 7 | tBHA Acetate, 0.1 (invention example) | 91L | 5 × 100 mL | >5 | >6.4 |
| 8 | AMPD, 0.0993 (invention example) | 91L | 1 × 100 mL | 16.00 | 16.80 |
| 9 | Sodium Bisulfite, 0.1035 (comparative example) | 91L | 5 × 100 mL | <0.05 | <0.06 |
| 10 | AMP, 0.0994 (invention example) | 91L 91M | 5 × 100 mL 1 × 100 mL | 40.00 | 70.80 |
| 11 | AMP-CO$_2$ salt, 0.1061 (AMP) (invention example) | 91L 91M | 5 × 100 mL 1 × 100 mL | 45.00 | 79.65 |

In general, the formaldehyde scavengers of the invention are effective in lowering the free formaldehyde as compared to the control sample (Bottle 1). In addition, as can be seen by the data, TA and MEA are particularly good and are observed to lower the vapor phase formaldehyde to non-detectable amounts—corresponding to a 5-order of magnitude reduction. The results for the other organic-based non-aminoalcohol formaldehyde scavengers, urea (comparative example), acetoacetamide (comparative example), tBHA (invention example) and tBHA acetate (invention example) also indicate efficacy with variable results. Finally, the inorganic material sodium bisulfite is shown to be highly effective in lowering formaldehyde levels, but this product evolves noxious $SO_2$ fumes upon atmospheric exposure thus significantly limiting its utility.

Examples 12 and 13

Evaluation of Coating of Tris (hydroxymethyl) aminomethane (TA)

A sample of TA crystals (0.1 g) is dissolved in water (0.3 g total solution weight). This solution is spread uniformly over the surface of a piece of corrugated cardboard (1.5"×4.5") and the specimen is allowed to air dry on an open benchtop overnight. An identical piece of cardboard is treated with 0.3 g de-ionized water following the same procedure. The dry cardboard samples are placed individually into clean, dry 1-liter glass bottles. Aliquots (10 microliters) of 18.5% aqueous formaldehyde in glass vials are placed into the jars which are subsequently sealed with caps having a port for sampling with Drager tubes. The jars are allowed to equilibrate under ambient laboratory conditions for 4 days. The jars are then sampled for free formaldehyde in the vapor phase by inserting a Drager tube through the port and withdrawing the headspace gas. A correction factor is applied to account for dilution during the sampling process.

| Bottle # | Amine, (g) | Drager Tube Used | #, volume of Drager aliquots | H2CO Reading (ppm) | Final H2CO (corrected, ppm) |
|---|---|---|---|---|---|
| 13 | Cardboard control | 91M | 1 × 100 mL | 15.00 | 15.75 |
| 14 | TA, 0.1 on cardboard | 91L, 91LL | 5 × 100 mL, 5 × 100 mL | <0.05 | <0.11 |

Comparing the results for the cardboard control (bottle 13) with the control sample in the previous examples (bottle 1) demonstrates that formaldehyde is partially adsorbed onto untreated cardboard. The large and positive effect of TA on further reducing formaldehyde to non-detectable levels remains intact even when the TA is physically coated onto a substrate. This clearly demonstrates the applicability of articles treated with TA and other formaldehyde scavengers as a means to lower airborne formaldehyde concentrations.

While the invention has been described above according to its preferred embodiments, it can be modified within the spirit and scope of this disclosure. This application is therefore intended to cover any variations, uses, or adaptations of the invention using the general principles disclosed herein. Further, the application is intended to cover such departures from the present disclosure as come within the known or customary practice in the art to which this invention pertains and which fall within the limits of the following claims.

What is claimed is:

1. A method for scavenging airborne formaldehyde, the method comprising:

providing an article that emits airborne formaldehyde into its environment;

contacting the airborne formaldehyde with a formaldehyde scavenger such that the airborne formaldehyde reacts with the formaldehyde scavenger to form a conjugate compound, wherein the formaldehyde scavenger is of the formula I:

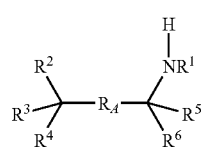
(I)

or salt thereof, in which $R_A$ is a bond or is $C(R^7R^8)$; $R^1$ is H, OH or $C_1$-$C_6$ alkyl; $R^2$ is H, OH or $C_1$-$C_6$ alkyl; $R^3$, $R^4$, $R^5$, and $R^6$ are independently H, or $C_1$-$C_6$ alkyl; and $R^7$ and $R^8$ are independently H, OH or $C_1$-$C_6$ alkyl;

wherein alkyl in $R^1$-$R^8$ is optionally independently substituted with OH, $NR^9R^{10}$, $C_1$-$C_6$ alkyl, or phenyl, and wherein $R^9$ and $R^{10}$ are independently H or $C_1$-$C_6$ alkyl, provided that if neither $R^7$ nor $R^8$ is OH, then at least one of $R^1$ and $R^2$ is OH.

2. The method of claim 1 wherein $R^1$ is H.

3. The method of claim 1 wherein $R_A$ is a bond and $R^2$ is OH.

4. The method of claim 1 wherein $R^1$, $R^3$, and $R^4$ are each H, $R^5$ is H or optionally substituted $C_1$-$C_6$ alkyl, and $R^6$ is optionally substituted $C_1$-$C_6$ alkyl.

5. The method of claim 3 wherein $R^1$ is OH.

6. The method of claim 5 wherein $R_A$ is a bond and $R^2$, $R^3$, $R^4$, and $R^5$ are each H.

7. The method of claim 5 wherein $R^6$ is optionally substituted $C_1$-$C_6$ alkyl.

8. The method of claim 1 wherein the formaldehyde scavenger is selected from the group consisting of: 2-amino-1-butanol, 2-amino-2-ethyl-1,3-propanediol, 2-amino-2-methyl-1-propanol, 2-amino-1-methyl-1,3-propanediol, tris (hydroxymethyl) aminomethane, n-isopropylhydroxylamine, ethanolamine, diethanolamine, N-methylethanolamine, N-butylethanolamine, monoisopropanolamine, diisopropanolamine, mono-sec-butanolamine, di-sec-butanolamine, and salts thereof.

9. The method of claim 1 wherein the formaldehyde scavenger and the conjugate compound are solids at ambient temperature and pressure.

10. The method of claim 1 wherein the conjugate compound is an oxazolidine, an oxazine, or a nitrone.

11. The method of claim 1 wherein the conjugate compound is of the formula II, III, or IV:

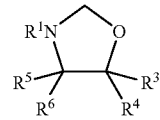
(II)

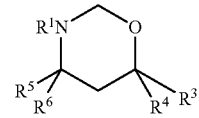
(III)

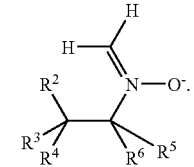
(IV)

12. The method of claim 1 wherein the formaldehyde scavenger is coated on the article or the article's packaging.

13. The method of claim 1 wherein the formaldehyde scavenger is a provided in a sachet.

14. A method for scavenging airborne formaldehyde, the method comprising:
providing an article that emits airborne formaldehyde into its environment;
contacting the airborne formaldehyde with tris (hydroxymethyl)aminomethane such that the airborne formaldehyde reacts with the tris (hydroxymethyl) aminomethane to form a conjugate compound, wherein the conjugate compound is

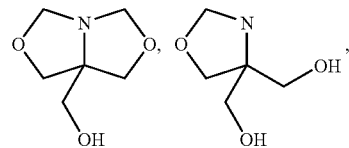

or mixtures thereof.

15. The method of claim 14 wherein the tris (hydroxymethyl) aminomethane is coated on the article.

16. The method of claim 14 wherein the tris (hydroxymethyl) aminomethane is provided in a sachet.

* * * * *